United States Patent
Kowalski et al.

(10) Patent No.: US 10,442,631 B2
(45) Date of Patent: Oct. 15, 2019

(54) DIRECTIONAL DISCHARGE WING PULLEY

(71) Applicant: Punching Concepts, Inc., Alpena, MI (US)

(72) Inventors: Nicholas L. Kowalski, Posen, MI (US); Brian J. Konieczny, Posen, MI (US); Matthew L. Gies, Alpena, MI (US); Edward E. Sanderson, Marquette, MI (US)

(73) Assignee: Punching Concepts, Inc., Alpena, MI (US)

( * ) Notice: Subject to any disclaimer, the term of this patent is extended or adjusted under 35 U.S.C. 154(b) by 5 days.

(21) Appl. No.: 15/709,945

(22) Filed: Sep. 20, 2017

(65) Prior Publication Data

US 2019/0084770 A1   Mar. 21, 2019

(51) Int. Cl.
*B65G 39/073* (2006.01)
*B65G 23/04* (2006.01)

(52) U.S. Cl.
CPC .......... *B65G 39/073* (2013.01); *B65G 23/04* (2013.01); *B65G 2201/04* (2013.01); *B65G 2812/02148* (2013.01); *B65G 2812/02168* (2013.01)

(58) Field of Classification Search
CPC ........ B65G 23/04; B65G 45/12; B65G 45/16; B65G 45/26; B65G 39/00; B65G 39/02; B65G 39/07; B65G 39/073; B65G 2812/02158; B65G 17/00; B65G 39/10
USPC ................ 198/494, 497, 499, 834, 835, 842
See application file for complete search history.

(56) References Cited

U.S. PATENT DOCUMENTS

| | | | |
|---|---|---|---|
| 1,335,421 A | 3/1920 | Black | |
| 1,980,777 A * | 11/1934 | Zollinger | B65G 39/071 198/501 |
| 3,038,590 A | 6/1962 | Arndt | |
| 3,046,805 A | 7/1962 | Van Gorp | |
| 3,055,229 A | 9/1962 | Mecham | |
| 3,354,735 A | 11/1967 | Holz | |
| 4,180,155 A | 12/1979 | Stevick | |
| 4,233,853 A | 11/1980 | Holz | |
| 4,284,409 A | 8/1981 | Randtron | |

(Continued)

*Primary Examiner* — Saul Rodriguez
*Assistant Examiner* — Lester III Rushin
(74) *Attorney, Agent, or Firm* — Warner Norcross + Judd LLP (57) ABSTRACT

A directional discharge wing pulley having a plurality of wings that discharge material in a single direction while properly tracking the conveyor belt. The directional discharge wing pulley may include a plurality of directional discharge wings, which are generally angled in a single or primarily in single direction across the entire face of the pulley. When pulley is operated a reverse rotation direction, the conveyor belt continues to properly track and the material is discharged in the opposite direction. The wings may have bends to create flat sections, or formed in a multiple arc pattern to create smoother changes in geometry or increased wing angle near the ends of the pulley, while generally maintaining a single direction wing through the entire pulley. Strengthening rib bends may be added near the end of a straight wing to add rigidity reducing the likelihood of wing fold over. The wings may include secondary wings, for example, in a Herringbone pattern. In some applications, the wings may include longitudinal or circumferential wing tips. In other applications, the wings may include a multi-start spiral.

25 Claims, 11 Drawing Sheets

(56) References Cited

U.S. PATENT DOCUMENTS

| | | | |
|---|---|---|---|
| 4,643,294 A | 2/1987 | Whited | |
| 4,718,544 A | 1/1988 | Herren | |
| 4,984,363 A | 1/1991 | Valster et al. | |
| 5,109,976 A | 5/1992 | Mohri et al. | |
| 5,180,155 A | 1/1993 | Asai | |
| 5,190,146 A | 3/1993 | Valster et al. | |
| 5,209,704 A | 5/1993 | Valster et al. | |
| 5,421,789 A | 6/1995 | Gregg | |
| 6,935,488 B2 | 8/2005 | Dow | |
| 6,938,754 B2 | 9/2005 | Kanaris | |
| 7,070,042 B2 | 7/2006 | Dow et al. | |
| 7,527,142 B1 * | 5/2009 | Zeltwanger | B65G 39/073 198/494 |
| 8,579,774 B2 | 11/2013 | Derscheid | |
| 8,739,965 B2 | 6/2014 | Laughlin | |
| 8,857,606 B2 | 10/2014 | Kowalski et al. | |
| 9,434,552 B2 | 9/2016 | Hamilton, Jr. | |

* cited by examiner

DIRECTIONAL DISCHARGE WING PULLEY

BACKGROUND OF THE INVENTION

The present invention relates to conveyor belt pulleys, and more particularly, to self-cleaning wing pulleys that are suited for bulk material handling applications.

In many types of conveyor applications, material can stick to or become entrapped behind the conveyor belt. When material is behind the conveyor belt, it is considered debris that must be displaced from the system for optimum conveyor belt traction and belt life.

The use of traditional straight, steep angled spiral, or symmetrically opposite angled wing pulleys is common in a wide variety of bulk materials handling applications. All three of these pulleys are constructed from materials and thicknesses that are appropriate for the size and rigor of the final application.

The traditional straight wing pulley is the original wing pulley. It is designed with plurality of radially spaced straight wings and wing tips that run the entire length of the pulley parallel to the central axis of rotation and perpendicular to the direction of belt travel. The design and manufacture of the traditional straight wing pulley is guided by ANSI/CEMA (American National Standards Institute/Conveyor Equipment Manufacturing Association) 501.1-2003(R2009) Specifications for Welded Steel Wing Pulleys.

The traditional straight wing pulley breaks material loose from the backside of the belt through the impact of the wing tips on the belt, but the debris falls between the wings of the pulley, where it can becomes trapped and recirculates between the belt and pulley. Additionally, traditional straight wing pulleys can have wing fold-over failures when heavy loads are applied due to the straight wings being perpendicular the direction of belt travel.

Steep angled spiral wing pulleys were introduced shortly after the traditional straight wing pulley in order to provide a wing pulley that would allow debris to enter the pulley and then slowly work its way out of the pulley. The original method for creating a spiral wrap was to attach a strap of flat material to the outside of a traditional straight wing pulley from a single start point at the center of the pulley. The strap was started at the center of the pulley and wrapped outward helically at a steep angle, generally 75 degrees or greater when measured in relation to the central axis of the pulley. This spiral wrap is duplicated on the second half of the pulley to create a symmetrically opposite wrap starting from a single start point. While the steep angle spiral assists by allowing debris to enter the pulley and slowly work outward, this does not align with more recent pulley designs that focus on rapid debris removal from a conveyor system.

The symmetrically opposite angled wing pulleys are the second generation of wing pulleys that have been found to clear debris up to 40× faster than traditional straight wing pulley. They are designed with wings that are formed or positioned at angles that are generally symmetrically opposite from the center of the pulley in an outward direction. This design moves material that falls between the wing and belt outward equally towards both ends of the pulley to eliminate recirculation of debris. The strength of the pulley is increased by the way the wings support the belt at an angle to the axis of rotation and belt travel. The limitations of the pulley are that the wings of the pulley must be symmetrically opposite for the conveyor belt to track properly and the pulley can only be operated in one direction of rotation. If the pulley is installed backwards or operated in a reversing application the symmetrically opposite angled wings will pull the debris inward to the center of the pulley at an accelerated rate, defeating the purpose of a wing pulley and potentially causing damage to the pulley and the conveyor belt.

SUMMARY OF THE INVENTION

The present invention provides a directional discharge wing pulley having a plurality of wings that discharge material in a single direction. In one embodiment, each directional discharge wing of the pulley is generally unobstructed from one end of the pulley to the opposite end. This design allows debris to be rapidly removed from the pulley in a single or primary direction while maintaining belt tracking, and can operate in reversing applications. U.S. Pat. No. 8,857,606 to Kowalski et al, which issued on Oct. 14, 2014, is incorporated herein by reference in its entirety. To increase the efficiency of the directional discharge wing pulley, any feature or combination of features listed in U.S. Pat. No. 8,857,606 may be used in conjunction with this design.

In various embodiments, the directional discharge wing pulley may include the following and other unique features:

1. Core. In one embodiment, the wing pulley includes a core. The core may be an assembly in a generally cylindrical shape consisting of an outer shell that is mated with a set of the end disks and/or hubs and bushings or bearings that are designed for pulley applications. The core may be longitudinally attached to a shaft that serves as the central axis of rotation for the cylindrically shaped core and for the complete pulley assembly. In some embodiments, an end disk is used at each end of the core to increase the size of the core, while accommodating smaller diameter hubs. The shell of the core can be constructed from tube or plate formed to create a polygon shape as disclosed in U.S. Pat. No. 8,857,606. The size of the core can be constructed in various diameters to alter the height and angle of the directional discharge wings.

2.. Directional Discharge Wings. The directional discharge wing pulley is designed with a plurality of directional discharge wings, which are generally angled in a single or primarily in single direction across the entire face of the pulley. The bottom edge of the vertical wing member connects externally to the core and is generally positioned in a diagonal toward opposite corners/ends of the core in both the longitudinal and latitudinal directions. In various embodiments, the vertical wing member is straight to form a single linear diagonal across the entire core or made up of smaller wing segments positioned generally diagonal to increase the angle of the individual wing segments. In various embodiments, the length of the directional discharge wings can be extended by helically winding the vertical wing member around the core past the opposite corners in a single plane. In various embodiments, the vertical wing member may have bends to create flat sections, or formed in a multiple arc pattern to create smoother changes in geometry or increased wing angle near the ends of the pulley, while generally maintaining a single direction wing through the entire pulley. In various embodiments, strengthening rib bends are added near the end of a straight wing to add rigidity reducing the likelihood of wing fold over. All wings of the directional discharge wing pulley are generally angled thru the pulley in the same direction; this allows the movement of debris to be directionally controlled based on the direction of pulley rotation about the central axis. The ability to move debris in a directional manner allows the directional discharge wing pulley to operate in reversing applications.

3.. Secondary Wings. Secondary wings are added to the directional wing pulleys when additional strength is required due to application needs or when single direction discharge is not required by the application. The bottom edge of the vertical wing member connects externally to the core. The set of secondary wings is added to connect the wings directly together in a herringbone pattern. An offset herringbone pattern allows for the majority of the pulley to directionally discharge. The directional discharge wings are shortened so that the inner end of the wing contacts the planar inner side of the secondary wing. The secondary wing connects to the planar backside of the forward directional discharge wing. In various embodiments, cleanout ports many be added to the secondary wings between the directional discharge wings. In various embodiments, the directional discharge wings of the pulley may need to be of equal length to the secondary wings, shifting the herringbone pattern used to tie the wings together to a location at or near the center of the pulley.

4.. Deflectors. In various embodiments, deflectors are included with straight and/or angled wings to accelerate debris removal from the pulley. In various embodiments, the deflectors are added to enhance the efficiency of the cleanout ports listed in U.S. Pat. No. 8,857,606. The cleanout port allows debris to pass through the wing, and then the deflector projects the debris outward from the pulley at an accelerated rate. The deflector is mounted at a tailing and outward angle to the wing to expel debris at an outward angle from the center of the pulley. The deflectors can be formed from the piece of material created by the cleanout port cutout or a separate piece of material attached adjacent the cleanout port or between wings with fasteners or weld. In various embodiments, deflectors are added to straight and angled wing pulleys independent of cleanout ports to enhance overall cleanout rates. The deflectors may be attached to the wing, core, or gusset depending on the amount of space available between the wings.

5.. Wing Tips. The wing tips for the directional discharge wing pulley can be constructed from a variety of material shapes that may include but are not limited to round, rectangular, square, hex, or half round. In some embodiments, no wing tips will be installed; the top surface of the wing will serve as the contact surface with the conveyor belt. Wing tips can be constructed of one or multiple pieces that follow the profile of the single wing or connect multiple wings. In various embodiments, wing tips are wrapped around the wing pulley circumferentially connecting to multiple wings or wing segments to add strength to the pulley and aid in tracking the belt. In various embodiments, a multi-start spiral may be used in place of wing tips.

6.. Multi-start Spiral. Multi-start spirals are wrapped around the pulley in patterns and at angles that match the type of debris that needs to be expelled from the conveyor system before entering the pulley. In various embodiments, a preferred outward angle of 45 degrees is desired for the spirals, but other acute angles 0-70 degrees may be used. Due to the acute angles of the spirals, multiple center start points are required at the center of the pulley. From the multiple start points, various spiral patterns may include but are not limited to trapezoidal, chevron, diamond, herringbone, or continuous arc for effective deflection of debris away from the pulley. In various embodiments, multi start spirals are attached to the outer circumference of traditional straight wing pulleys and the outer surface of drum pulleys. In various embodiments, the multi-start spirals may be made from but are not limited to flats, rounds, hex, or other materials that are attached together to construct the desired angles or pattern.

The present invention provides a wing pulley that provides controlled discharge in a single direction. This can be beneficial by depositing all of the discharged material on one side of the conveyor and protects objects on the opposite side of the conveyor from being subjected to discharge. It can also facilitate clean-up of discharged material by allow clean-up to take place on only one side of the conveyor. The use of a circumferential wing tips helps to ensure that the conveyor belt tracks straight and is not urged off of the wing pulley by the angled wings. In an alternative embodiment, the present invention provides a herringbone wing arrangement that discharges in both directions, but provide enhanced strength and belt support. The herringbone arrangement can be positioned off-center to control the amount of material that is discharged in each direction.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION OF THE CURRENT EMBODIMENT

A directional discharge wing pulley (1) in accordance with one embodiment of the present invention is shown in FIGS. 1-11. The directional discharge wing pulley (1) is intended for use in supporting a conveyor belt in a wide range of conveyor systems. The directional discharge wing pulley (1) is well suited for non-drive locations of a conveyor system, such as an idler pulley or a tensioner pulley, but may be used as a drive pulley in drive applications. As a wing-type pulley, the discharge wing pulley (1) is a particularly beneficial where debris is present. While the directional discharge wing pulley (1) may be used to tension, drive or otherwise support the belt of a conveyor system, the primary distinguishing functions of this angled wing pulley are to provide enhanced cleanout in a single or primary direction while maintaining proper belt tracking and the ability to operate in reversing applications. When the directional discharge wing pulley (1) is used with deflectors (3), the cleanout rate for debris that makes its way into the body of the pulley is increased. When multi-start spirals (4) are used with a directional discharge wing pulley (1), the rate of debris removal from the conveyor system before it makes it into the body of the pulley is increased. If additional strength is required for the directional discharge wing pulley (1), strengthening rib bends (M) can be added to the individual directional discharge wings (2) or a set of secondary wings (K) can be added to create a herringbone pattern that is generally offset to the non-discharge end of the pulley. Circumferential wing tips (R) may be added to the directional discharge wing pulley (1) to add strength and aid in tracking the conveyor belt.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Figure 1:
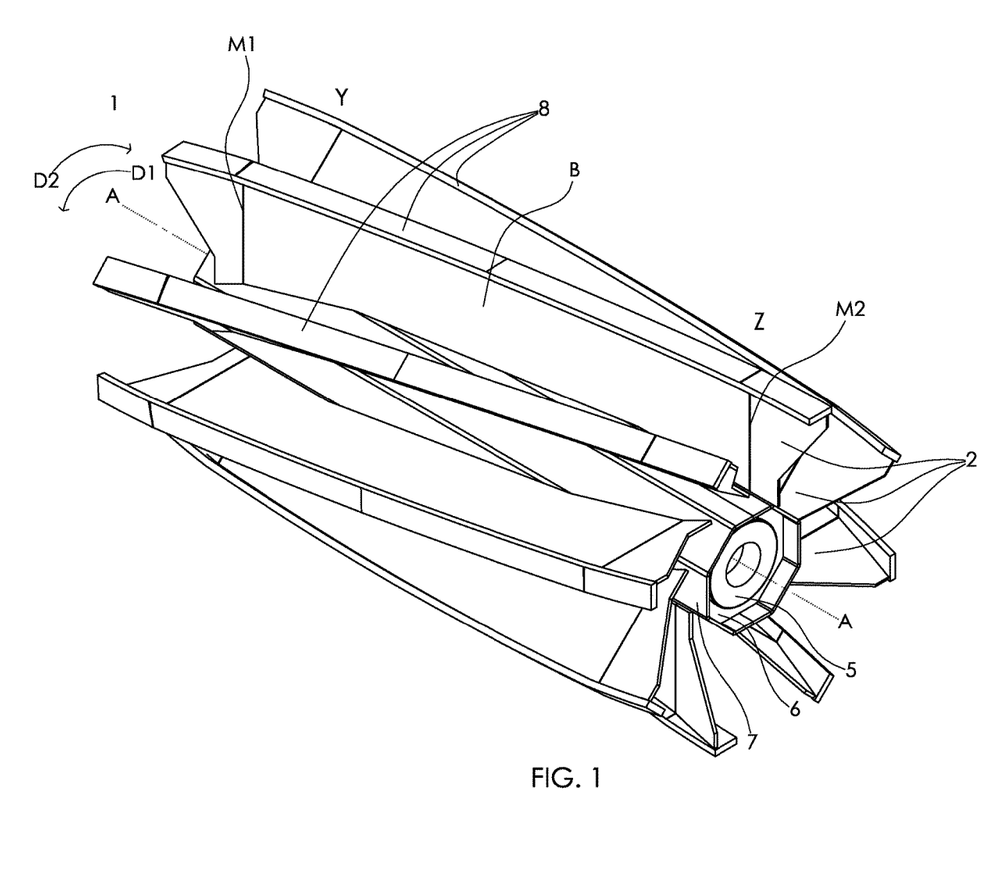
FIG. 1 is an isometric view of a directional discharge wing pulley with strengthening rib bends.

The directional discharge wing pulley (1) is coupled to a shaft. In typical applications, the shaft is fixed to and rotates with the wing pulley (1). In applications of this type, the shaft is often rotatable secured to a mounting structure upon bearings or other structure capable of allowing rotation of the shaft. In other types of applications, the shaft may be fixed in a non-rotatable manner to a mounting structure, and the wing pulley (1) may rotate about the shaft. In the illustrated embodiment, the wing pulley (1) and shaft are joined and configured to rotate together. The shaft (not shown) may be affixed to the wing pulley (1) using essentially any structure. Referring now to FIG. 1, the directional discharge wing pulley (1) includes two hubs (5) which are used to connect the assembly to bushings (not shown) and a shaft (not shown). In various embodiments, the hubs (5) are used with a pair of end disks (6) to connect to the core (7), or in other embodiments, the hubs (5) can be connected directly to the core (7). For example, as shown in FIG. 1, the end disk (6) may include an outer circumferential edge that is affixed to the core (7), for example, by welding, and define an internal circular opening (not shown) configured to receive and seat the hub (5). The hubs (5) may be joined to the end disks (6) in essentially any way, for example, by weld, bolts, screws or other fasteners. Although only one end of the wing pulley (1) is shown in FIG. 1, it should be noted that an identical end disk (6) is located toward the opposite end of the wing pulley (1). Although not illustrated, each hub (5) may define a central opening configured to receive a coupling component, such as a bushing (not shown), for joining the hubs (5) to the shaft (not shown). The central opening in the hub (5) and the outer surface of the bushing (not shown) may be tapered to facilitate a tight interfit. It should be understand that directional discharge wing pulley (1) may be joined to the shaft (not shown) using essentially any suitable structure. For example, the shaft may be welded directly to the end disks (6) or the hubs (5). As another example, the hubs (5) may include set screw(s) and a keyway for joining the wing pulley to the shaft. In another alternative example, the hubs may be a compression-style hubs that are joined to the shaft by tapered bushings. In yet another example, the end disks (6) may be fitted with bearings, such as piloted flange bearings, that are configured to rotatably receive a fixed (e.g. non-rotatable) shaft.

The directional discharge wing pulley (1) includes a core (7) configured to support the wings (2). The core (7) of the directional discharge wing pulley (1) may be polygon shaped (as depicted) or round when viewed from the end. For example, the core (7) may be defined by a plurality of eight flat sections that cooperatively form an octagon core supporting eight wings (2). The number of core sections may vary from application to application. For example, an alternative core may include ten flat sections that cooperatively support ten wings. As an alternative to a polygon structure, the core (7) may be manufactured from a section of tube stock. This hub (5), end disk (6), and core (7) combination is used to create a generally cylindrical shaped substructure for the directional discharge wing pulley (1). The bottom edge of the directional discharge wing (2) is profiled to fit tightly onto the core (7) positioned diagonally towards opposite ends/corners. Each wing (2) is affixed to the core (7), for example, by mechanical interfitting, fasteners and/or welding. A plurality of directional discharge wings (2) are radially positioned around the core (7) to support the belt. In the illustrated embodiment, the wing pulley (1) includes eight wings (2). The number and thickness of the directional discharge wings (2) is varied based on the application in which the directional discharge wing pulley (1) is being used. In this figure, flat bar wing tips (8) are depicted at the top of each directional discharge wing (2), however, wing tips (8) may be made from shapes that include but are not limited to square, hex, half round, or have no wing tips at all. The wing tips (8) may be integrally formed with or joined to the wings (2). When joined to the wings (2), the tips (8) may be separately manufactured and then affixed to the wings (2), for example, by mechanical interfitting, fasteners and/or welding. In various embodiments, no wing tips (8) will be installed, and the top surface of the directional discharge wings (1) will serve as the contact surface with the conveyor belt. In this embodiment, the directional discharge wing (2) wing tips (8) will gradually come in to contact with the belt and provide continuous contact with the belt with no belt beating contact. The directional discharge wing pulley (1), when fully assembled, will be installed in the conveyor system in a manner where it will rotate about the central axis (A). When rotating about central axis (A), the directional discharge wing pulley (1) can rotate in direction (D1) which allows debris to flow through the directional discharge wing pulley (1) from (Y) to (Z) in the figure. If the direction of rotation is changed to (D2), the debris will flow through the single direction wing pulley (1) from (Z) to (Y). The directional discharge wing pulley (1) is the only angled wing pulley that can operate on a conveyor that moves in both forward (D1) and reverse (D2) directions and is the only angled wing pulley where the direction of debris cleanout can be controlled from (Y) to (Z) or (Z) to (Y). Also shown in this figure are strengthening rib bends (M) at the outer ends of the directional discharge wings (2) to add strength to the wing and prevent wing fold over. The strengthening rib bends (M) are oriented to assist in moving debris in the same direction as the wings. On the directional discharge wings (2) the strengthening rib bends are formed in opposite directions, where on traditional straight wings they may be formed in the same or opposite directions. The number, location, arrangement and shape of strengthening rib bends (M) may vary from application to application. In some applications, the wings (2) may include no strengthening rib bends (M) or the strengthening rib bends (M) may be replaced by supplemental strengthening material.

The longitudinal extent of the wings (2) extends at an angle with respect to the longitudinal axis of the wing pulley (1) may vary from application to application. This angle may vary from any angle greater than 0 degrees up to 70 degrees, and may in some applications be about 45 degrees. In typical applications, all of the wings (2) extend at the same longitudinal angle (or angles, when rib bends (M) are included), but it may be desirable in some applications for the longitudinal angle to vary from one wing (2) to another on the same wing pulley (1). In some applications, the wings (2) may be curved or have one or more curved portions along their longitudinal length. The lateral extent of the wings (2) may extend at a range of angles with respect to the radius of the core (7). For example, the center of each wing (2) may extend along a radius of the core (7) with the remainder of the wing (2) extend along the same lateral angle. Alternatively, the lateral angle of each wing (2) may vary along the length of the wing (2). In some applications, the wing (2) may have a curved shape with a lateral angle that varies. For example, the wings (2) may follow a spiral configuration and have a lateral angle that coincides with the radius of the core at each point along its length.

Figure 2:
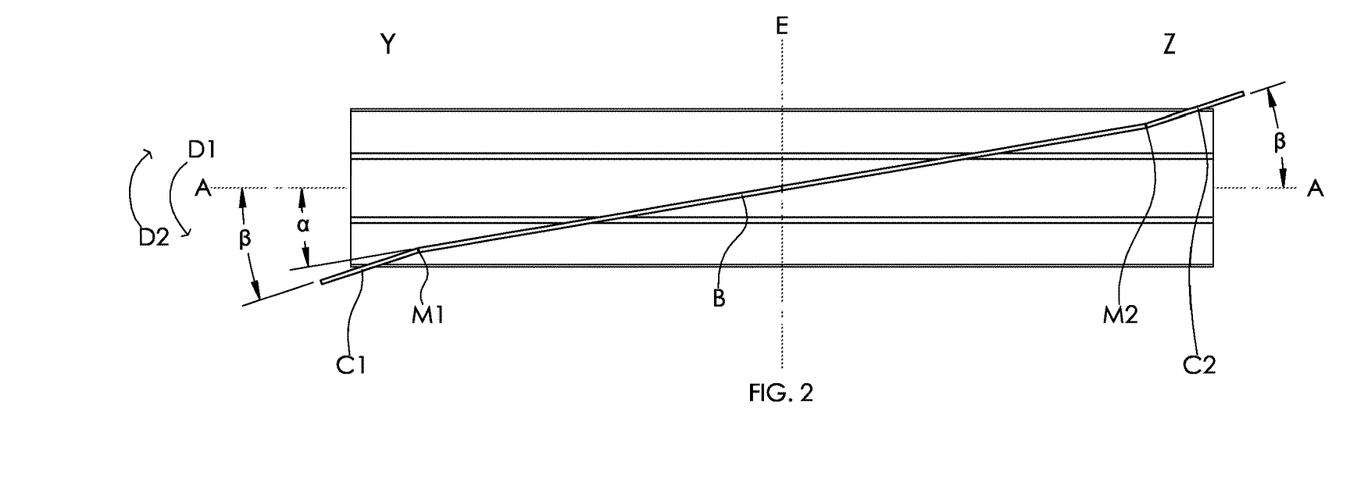
FIG. 2 is a top view of a directional discharge wing with strengthening rib bends on a core.

In FIG. 2, one directional discharge wing (2) is assembled to the core (7) from a top view. In this embodiment, the directional discharge wing (2) is displayed as diagonally towards opposite corners of the core (7). More specifically, the wing (2) of this embodiment extends from a point proximate the corner formed by one longitudinal side of the core with one axial end of the core to a point proximate the opposite corner formed by the opposite longitudinal side of the core with the opposite axial end of the core. Each additional wing (2) may be similarly oriented from corner to corner at its respective position on the core (7). Although the illustrated embodiment includes an octagon-shaped core, it should be understood that in alternative embodiments, the corners may be defined by sides and ends of a tubular core or core having a different number of planar segments. This method of positioning the directional discharge wing (2) allows the angle ($\alpha$) to change as diameter of the core (7) or the length of the directional discharge wing pulley (1) is changed. In this embodiment, angle ($\alpha$) is approximately 10 degrees, but that angle may vary with the length of the wing pulley (1), the diameter of the core (7) or the number of core segments. For example, angle ($\alpha$) may be in the range of approximately 0 degrees to 70 degrees. The strengthening rib bends (M1) (M2) are bent to angle ($\beta$) and located on the directional discharge based on the demands of the conveyor application. In this embodiment, angle ($\beta$) is approximately 20 degrees, but that angle may vary as desired. For example, angle ($\beta$) may be in the range of approximately 0 degrees to 70 degrees. In this embodiment, the angle ($\beta$) has been set so the wing sections (C1) (C2) are equal and opposite, but the angles and section lengths may vary based on the application and the debris being removed. In some applications, a greater number of strengthening rib bends (M) may be beneficial to strengthening wings. This figure also helps to illustrate how, as the directional discharge wing pulley (1) rotates in direction (D1) about central axis (A), the directional discharge wing (2) acts as a plow moving any debris from (Y) to (Z) in the figure. In contrast, if the directional discharge wing pulley (1) rotates in direction (D2) about the central axis (A), the directional discharge wing (2) acts as a plow moving any debris from (Z) to (Y).

Figure 3:
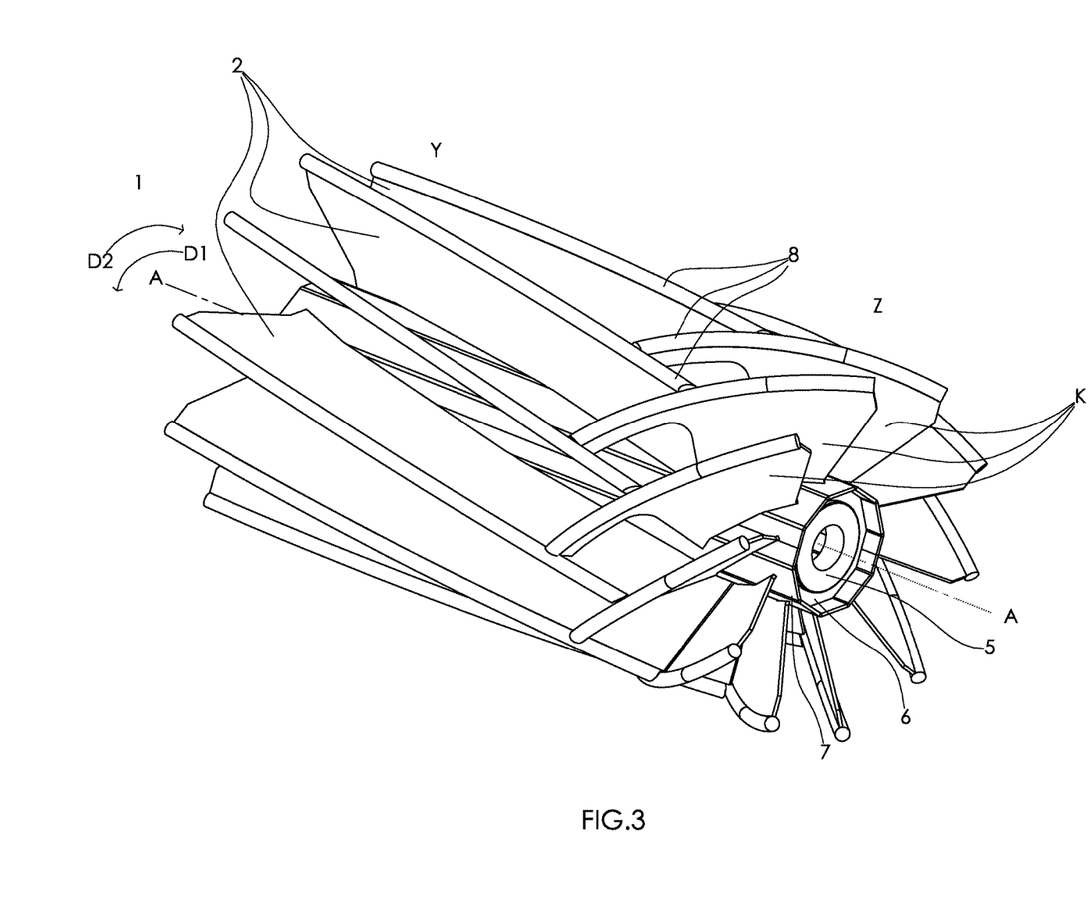
FIG. 3 is an isometric view of a directional discharge wing pulley with secondary wings.

In FIG. 3, the hubs (5), end disks (6), and core (7) are the same as described in FIG. 1, however in extreme applications or when single direction discharge is not required, a secondary wing (K) has been added to tie multiple directional discharge wings (2) together. The secondary wing (K) is attached to the backside of a directional discharge wing (2) and to the end of the following directional discharge wing (2). A plurality of secondary wings (K) are radially positioned to create a staggered herringbone between the secondary wing (K) and the directional discharge wing (2). The secondary wing is profiled at the bottom of the vertical wing member to fit tightly on the core (7). In this embodiment, a cleanout port as described in U.S. Pat. No. 8,857,606 has been added to the secondary wing (K) to allow material to pass between the secondary wing (K) and the directional discharge wing (2). As noted above, U.S. Pat. No. 8,857,606 to Kowalski et al, which issued on Oct. 14, 2014, is incorporated herein by reference in its entirety. In various embodiments, the staggered herringbone pattern is offset to one side to encourage debris to be discharged primarily to one side of the pulley. In various embodiments, the staggered herringbone pattern could be near or at the center of the pulley when the discharge of material to both sides of the pulley is required or desired. When the secondary wing (K) is used with the directional discharge wing (2), the pulley will no longer discharge material as effectively in reversing applications.

Figure 4:
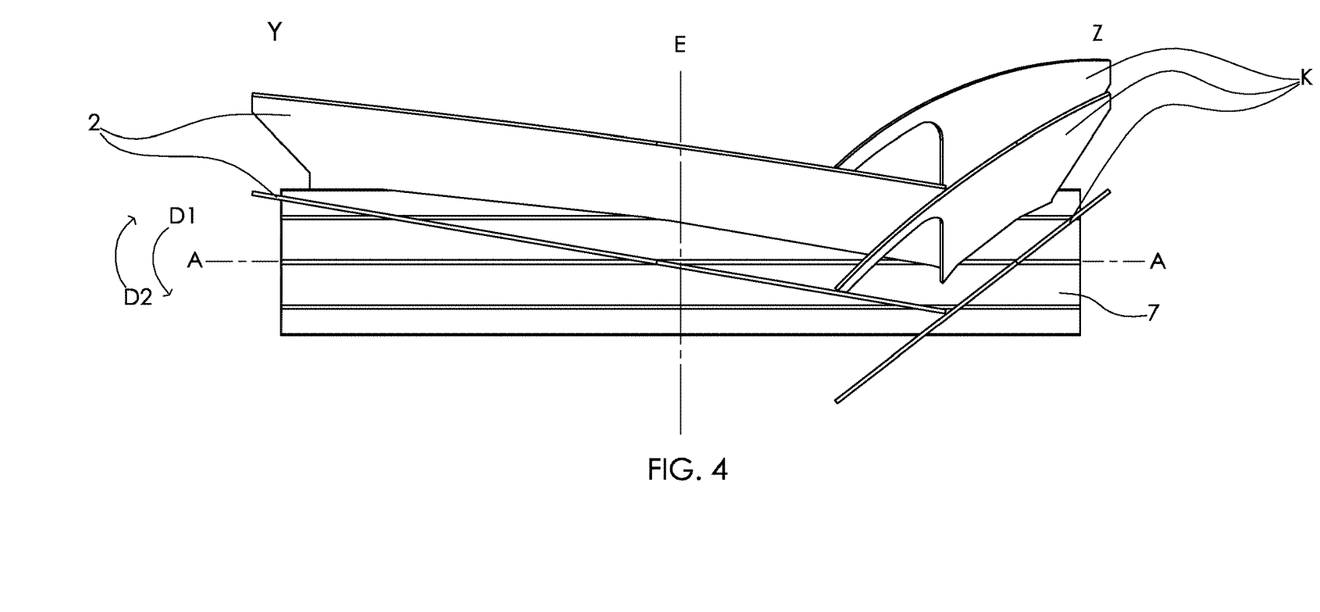
FIG. 4 is a top view of the secondary wing patterned to create a herringbone connection.

In FIG. 4, two directional discharge wings (2) are assembled to the core (7) and attached to three secondary wings (K). From this top view, the herringbone pattern created by the alternating connecting points of the directional discharge wings (2) and secondary wings (K) is depicted. In this embodiment, the connection point of the directional discharge wings (2) and the secondary wings (K) are offset to the (Z) end of the pulley to encourage the majority of the debris to discharge to the (Y) end of the pulley. In various embodiments, the connection point of the directional discharge wings (2) and the secondary wings (K) may be closer to or at the centerline (E) of the pulley when directional discharge is not required for the conveyor application.

Figure 5:
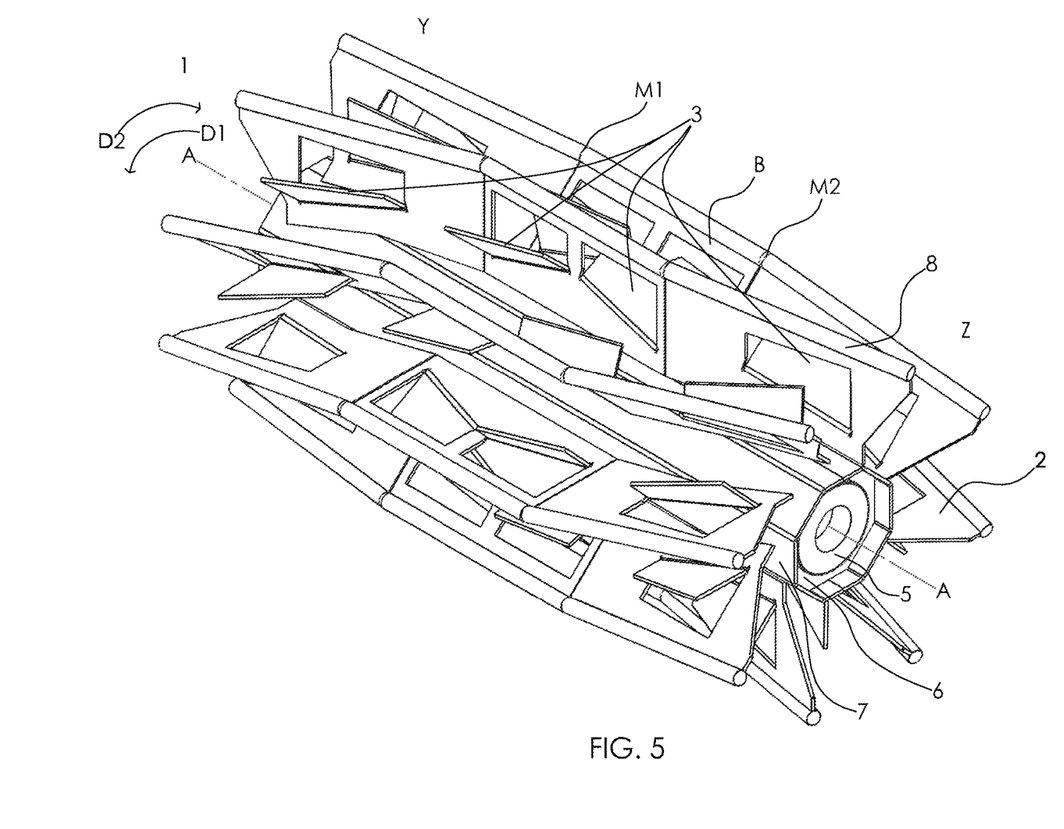
FIG. 5 is an isometric view of a directional discharge wing pulley with deflector.

In FIG. 5, the hubs (5), end disks (6), and core (7) are the same as described in the FIG. 1, but the directional discharge wing (2) has been modified with a set of strengthening rib bends (M1) (M2) that create a straight (i.e. aligned with the longitudinal axis of the wing pulley (1)) center section (B) near the middle of the pulley. The pulley in this embodiment is stronger than a straight directional discharge wing (2) and creates a belt beating effect as the straight center section (B) of the directional discharge wing (2) comes into contact with the belt. Also depicted in this embodiment are deflectors (3), which are used to accelerate the speed at which debris is expelled from between the directional discharge wings (2). Each deflector (3) may be generally planar and may extend at a single angle (e.g. a bend angle) or a compound angle (e.g. a bend angle and a pitch angle). In the illustrated embodiment, each deflector (3) is manufactured by bending a portion of the wing (2) away from the planar extent of the wing (2). For purposes of this disclosure, the angle at which each deflector (3) is bent away from the plane of the wing (2) is referred to as the "bend angle" of that deflector (3). It should be understood, however, that the deflectors (3) need not be formed from a bent portion of the wing (2) and that use of the term "bend angle" should not be interpreted to limit the present invention to applications in which the deflectors (3) are formed by bending material out of the wings (2). For example, a deflector (3) may be separately manufactured and secured to the wing (2) by welding or other suitable methods while still using the term "bend angle" to refer to the angle at which the planar extent of the deflector (3) extends with respect to the planar extent of the wing (2). Each deflector (3) may also have a "pitch angle," which is used to refer to the angle at which the bend line (or connection line) between the deflector (3) and the wing (2) extends with respect to the longitudinal axis (or central axis of rotation) of the pulley. When it is desirable to set the deflectors (3) at a single angle, the pitch angle can be 0 degrees so that the bend line (or connection line) extends parallel to the central axis of rotation (A). In single angle embodiments, the bend angle may be set so that the deflectors (3) trail or lead the wing (2) at a bend angle ranging from just greater than 0 degrees to about 70 degrees, but may be in some applications be most effective at approximately 45. While the deflectors (3) can be set at a single angle, a compound angle combining a bend angle and a pitch angle in an outward direction from center line (E) may promote optimum debris removal in some applications. The pitch angle of the deflector (3) may vary from application to application, but can optionally be set at the steepest possible incline for the height of the deflector (3) and the height of the wing (2) (the height of the wing generally defined as a line set from the lowest point at the outer end of the core (7) to point that is at the highest point of the wing (2) closer to the centerline (E) of the pulley (1)). When measured from the axis of rotation (A), the pitch angle can range from 0 degrees to 90 degrees with 45 degrees being the most effective for some applications. Working in conjunction with the cleanout ports listed in U.S. Pat. No. 8,857,606, the deflectors (3) fling the material outward from the pulley before coming in contact with the trailing directional discharge wing (2). Four deflectors (3) were used in each wing of the directional discharge wing pulley (1) in this figure. The number, location, arrangement, angle and size of the deflectors will be adjusted based on the size and volume of debris in the conveyor application. The deflector (3) is effective in both angled and traditional straight wing pulleys.

Figure 6:
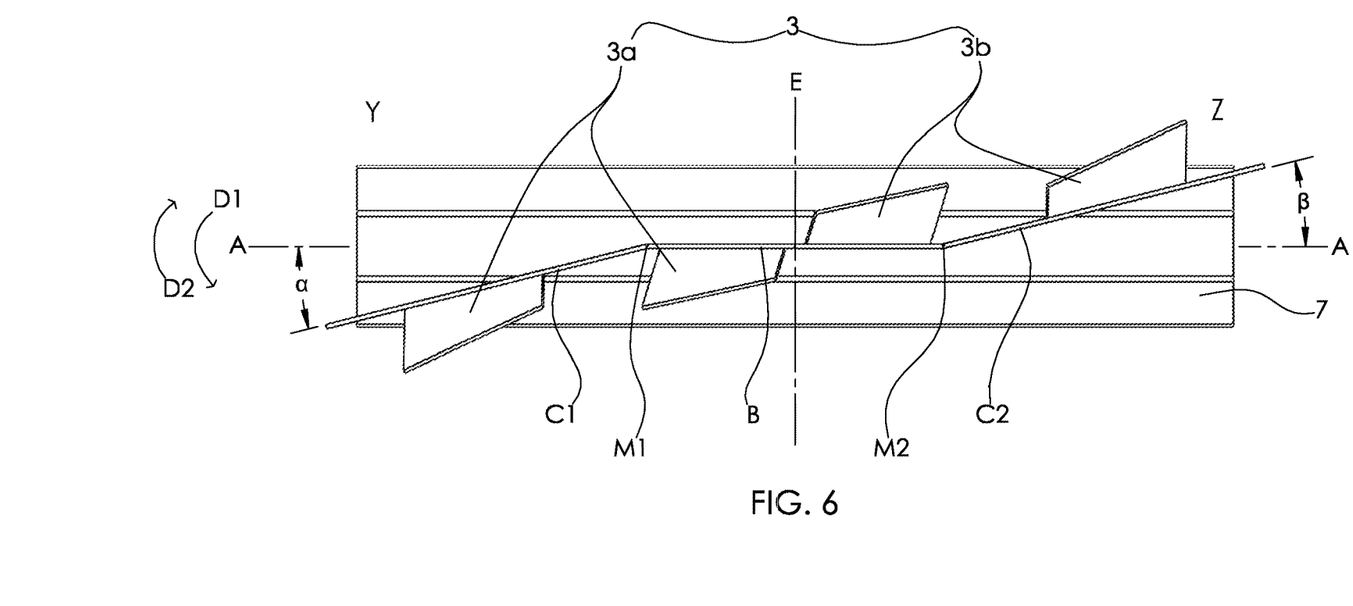
FIG. 6 is a top view of a directional discharge wing with deflectors on a core.

In FIG. 6, a directional discharge wing (2) is assembled to the core (7). The top view shows a directional discharge wing (2) with a straight center section (B) which increases the belt beating effect of the directional discharge wing (2) by increasing the angles ($\alpha$) and ($\beta$) of sections (C1) and (C2) to increase debris cleanout. The strengthening rib bends (M1) and (M2) serve as the locations for the change in geometry for the straight (B) and angled (C) wing sections and adds strength to the directional discharge wing (2) to prevent wing fold over. While angles ($\alpha$) and ($\beta$) and sections (C1) and (C2) are depicted as symmetrical in this figure, asymmetrical angles and section lengths may be used in some applications. The directional discharge wing (2) in this embodiment is still defined by opposite corners/ends of the core (7), but section (B) is used to increase angles ($\alpha$) and ($\beta$) of sections (C1) and (C2). This slight change in the geometry of the directional discharge wing (2) can accelerate the rate of directional discharge of debris. As the directional discharge wing pulley (1) rotates in direction (D1) about central axis (A), the directional discharge wing (2) acts as a plow moving any debris from (Y) to (Z) in the figure. In contrast, if the directional discharge wing pulley (1) rotates in direction (D2) about the central axis (A), the directional discharge wing (2) acts as a plow moving any debris from (Z) to (Y).

Also illustrated in this figure are deflectors (3) (3a) (3b) in both angled and straight sections of the directional discharge wing (2). When deflectors (3) (3a) (3b) are used in a pulley, the direction of rotation is considered to ensure the debris is effectively moved by the directional discharge wing (2). The deflectors (3) (3a) (3b) in this figure are set up for a reversing application. The centerline (E) defines the longitudinal center of the pulley. When the directional discharge wing pulley (1) rotates in direction (D1) about the central axis (A), the (Y) side deflectors (3a) pull in the debris in and assist in pushing the debris to the (X) side at an accelerated rate, due to the deflector angle in both the angled (C) and straight (B) sections of the directional discharge wing (2). As noted above, the deflectors (3) may extend at a single angle (e.g. a pitch angle of about 0 degrees and a bend angle ranging from just greater than 0 degrees to about 70 degrees) or a compound angle (e.g. a pitch angle ranging from about 0 degrees to about 90 degrees and a bend angle ranging from just greater than 0 degrees to about 70 degrees). In the illustrated embodiment, the pitch angle of each deflector (3) may be about 15 degrees and the bend angle of each deflector may be about 45 degrees. Once the debris is deflected past the centerline (E), the (X) side deflectors (3b) fling the debris outward at the (X) side discharge end of the directional discharge wing pulley (1). In contrast, if the directional discharge wing pulley (1) rotates in direction (D2) about the central axis (A), the (X) side deflectors (3b) pull in the debris in and assist in pushing the debris to the (Y) side. Once the debris is deflected past the centerline (E), the (Y) side deflectors (3a) fling the debris outward at the (Y) side discharge end of the directional discharge wing pulley (1).

Figure 7:
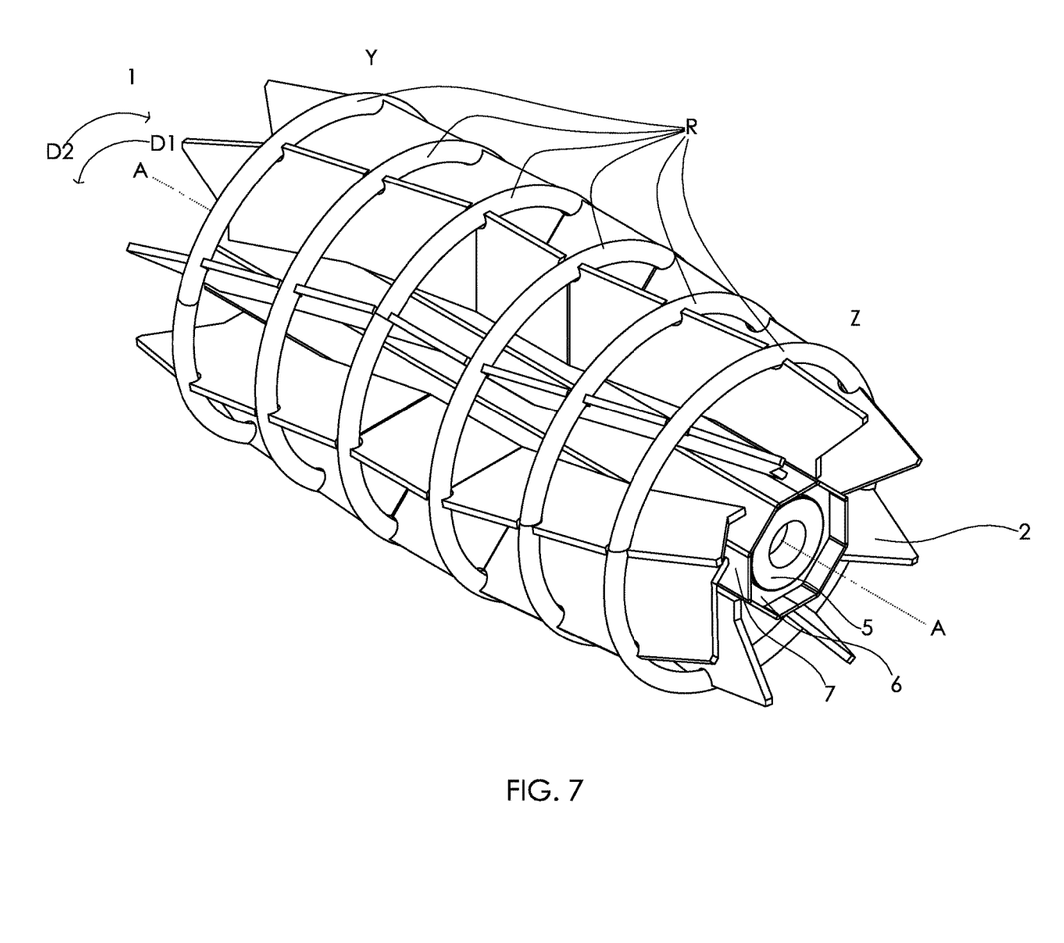
FIG. 7 is an isometric view of a directional discharge wing with circumferential wing tips

FIG. 7 depicts a directional discharge wing (1) with the same hubs (5), end disks (6), and core (7) as shown in previous figures and a set of the directional discharge wings (2) have a flat section at the center of the pulley. In this embodiment, the wing tips (8) that followed the tops of the wings have been eliminated, and a set of circumferential wing tips (R) have been add to contact the belt. The circumferential wing tips (R) are designed to wrap around the circumference of the directional discharge wing pulley (1) to support the belt and to aid in tracking the belt. The circumferential wing tips (R) are designed of materials and of sizes that are appropriate for the conveyor application, the spacing between and the number of circumferential wing tips (R) on the pulley are also varied by application. Circumferential wing tips can be made from but are not limited to rounds, flats, angle, hex, or any other material shape that will provide proper support to the belt. The number, shape, location and arrangement of circumferential wing tips may vary from application to application. In this embodiment, the circumferential wing tips (R) have essentially the same radius as the wings (2). The radius of each wing tip (R) may, however, vary from that of the wing (2). For example, the wing tips (R) may be slightly proud or slightly recessed with respect to the outer edge of each wing (2). Although referred to as "circumferential" wing tips (R), the wing tips (R) need not be circular, but instead may include linear section or otherwise shaped segments that bridge between adjacent wings (2). For example, the circumferential wing tips (R) may have an octagon arrangement of straight sections that extend from wing to wing.

Figure 8:
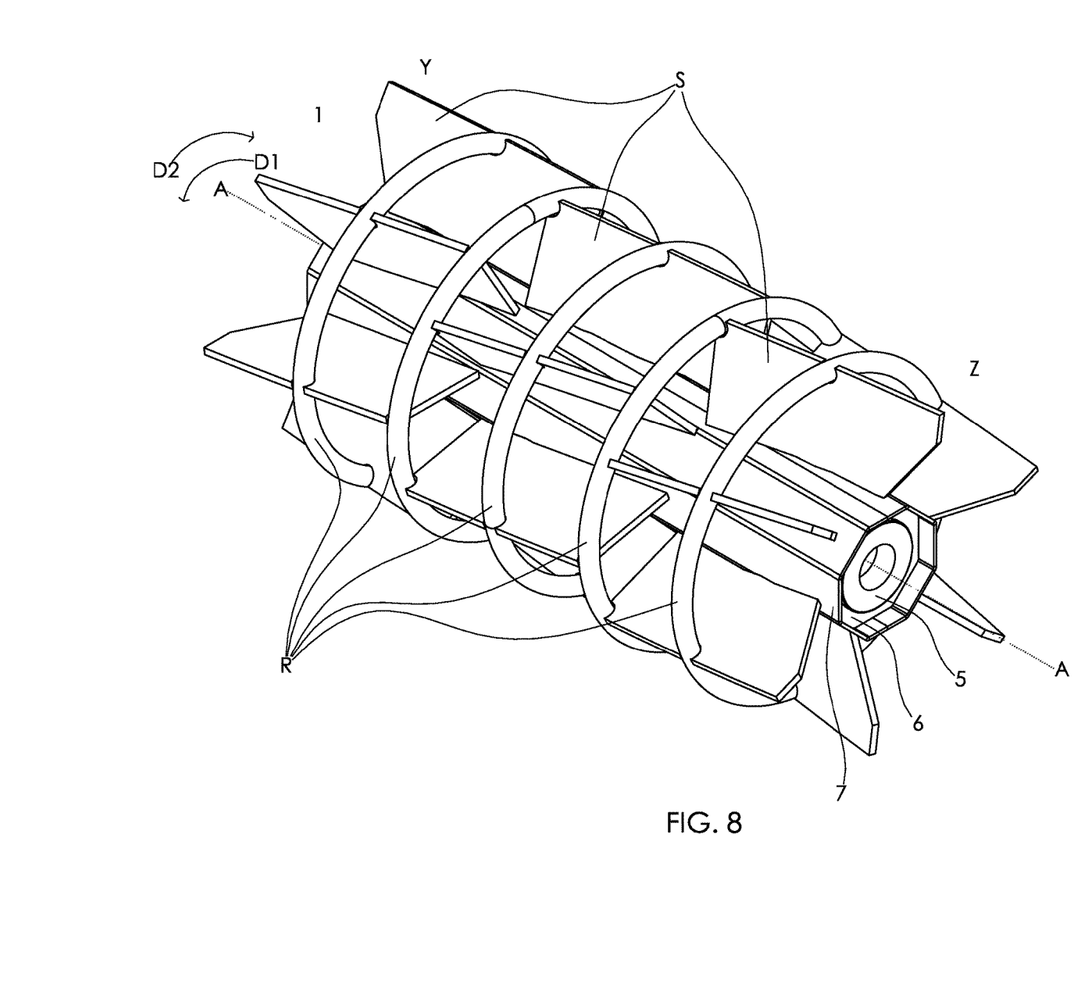
FIG. 8 is an isometric view of a directional discharge segmented wing with circumferential wing tips

FIG. 8 is a directional discharge wing pulley (1) with segmented directional discharge wings (S) and circumferential wing tips (R). The segmented directional discharge wing (S) is similar the directional discharge wing (2) shown in FIG. 1, but the wings have been made shorter and quantity of wings have been increased on the pulley. The segmented directional discharge wing (S) allows for a greater wing angle while maintaining directional discharge of material from one end of the pulley to the other. In the illustrated embodiment, the wing pulley (2) has three wing segments, but the number of wing segments may vary. In the illustrated embodiments, the longitudinal gaps between adjacent wing segments may vary. For example, adjacent wing segments may be extended to overlap or shortened to provide a gap between adjacent wing segments. To support and add strength to this pulley, circumferential wing tips (R) have been added to connect multiple segmented directional discharge wings (S) together. The number, location and arrangement of wing tips (R) may vary from application to application as desired. The wing tips (R) may be excluded in some applications. In various embodiments, the segmented directional discharge wings (S) may have strengthening rib bends (M) added to add strength to prevent wing fold over and increase the angle of the wing.

Figure 9:
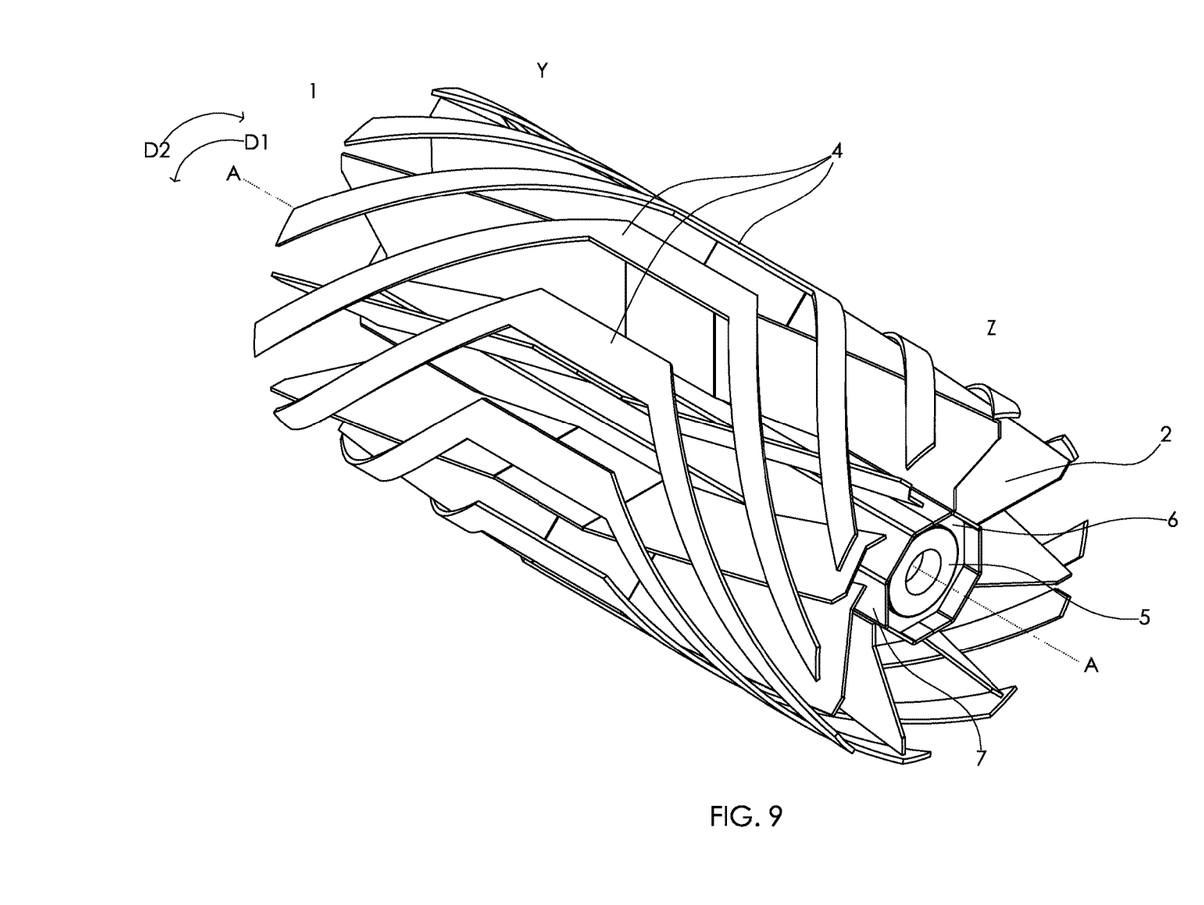
FIG. 9 is an isometric view of a multi-start spirals on a directional discharge wing pulley.

In an alternative embodiment, the present invention includes a multi-start spiral that defines the outer circumference of the wing pulley (1). In the illustrated embodiments, the multi-start spiral is defined by a plurality of individual spirals that are spaced apart and extend around the periphery of the wing pulley (1). FIG. 9 illustrates multi-start spirals (4) installed on a directional discharge wing pulley (1). While the directional discharge wings pulley is constructed from the same hubs (5), end disks (6), core (7) and directional discharge wings (2), there are no wing tips (8) as depicted in FIG. 1, as they have been replaced with multi-start spirals (4). In various embodiments, the multi-start spirals (4) are designed with angled sections of wrap that are at a 0-70 degree angle in relation to the central axis. The multi-start spirals can be made in patterns that include but are not limited to trapezoidal shaped, v-shaped, continuous arc shaped, circular shaped, herringbone staggered, or in a diamond pattern depending on the application and the debris that is present in the system. Multi-start spirals can be used on various types of conveyor pulleys, including but not limited to angled wing pulleys, traditional straight wing pulleys, and drum pulleys. The multi-start spirals (4) are designed to be used in either single direction (D1) or (D2) rotation about central axis (A), or in two direction (D1) and (D2) rotation about the central axis (A).

Figure 10:
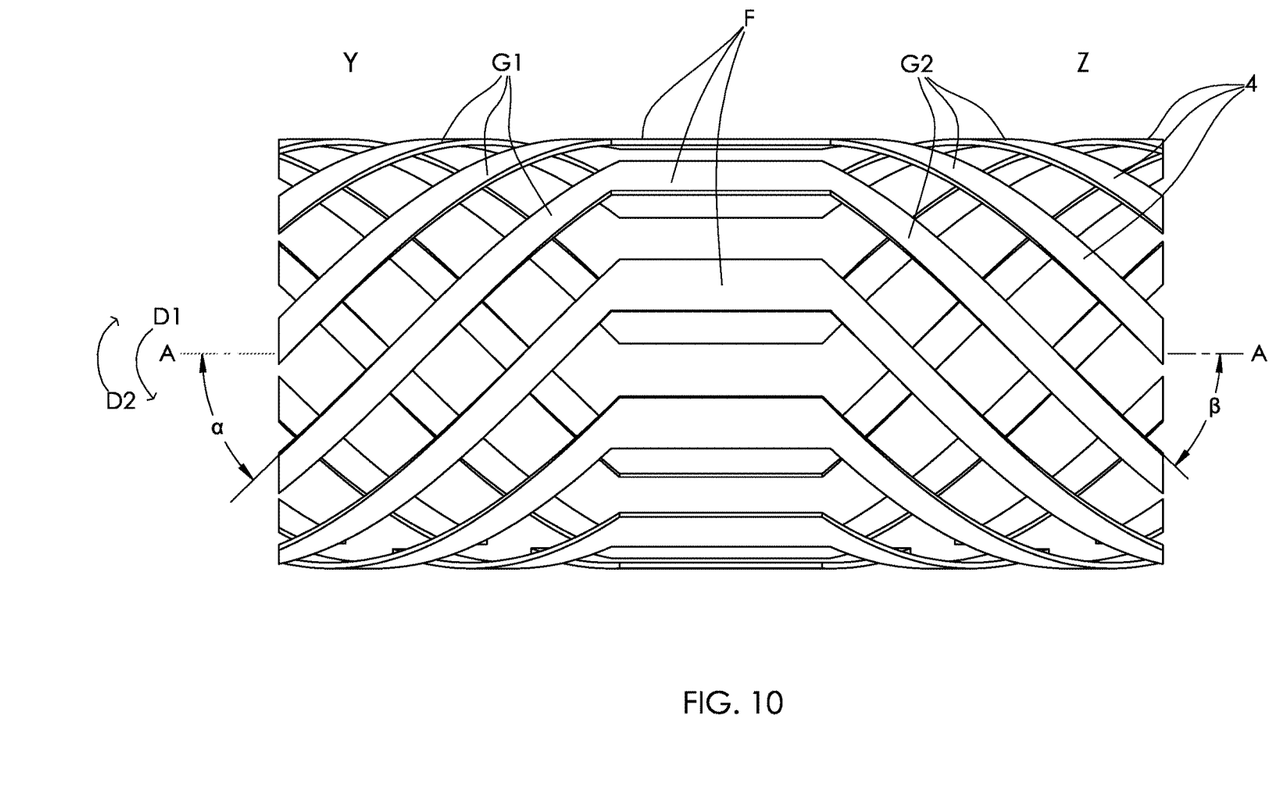
FIG. 10 is a top view of multi-start spirals with a trapezoidal shaped profile.

In FIG. 10, the multi-start spirals (4) are depicted with individual spirals that are arranged in a trapezoidal pattern that has angled sections (G1) and (G2) angled outward toward the end of the pulley from the centers section (F). The angled sections (G1) and (G2) of the multi-start spirals (4) are generally set at acute angles ($\alpha$) and ($\beta$) of 0-70 degrees when measured from both ends of the directional discharge wing pulley (1) in relation to the central axis (A). While angles ($\alpha$) and ($\beta$) are depicted as symmetrical, asymmetrical angles may be used in some applications.

Figure 11:
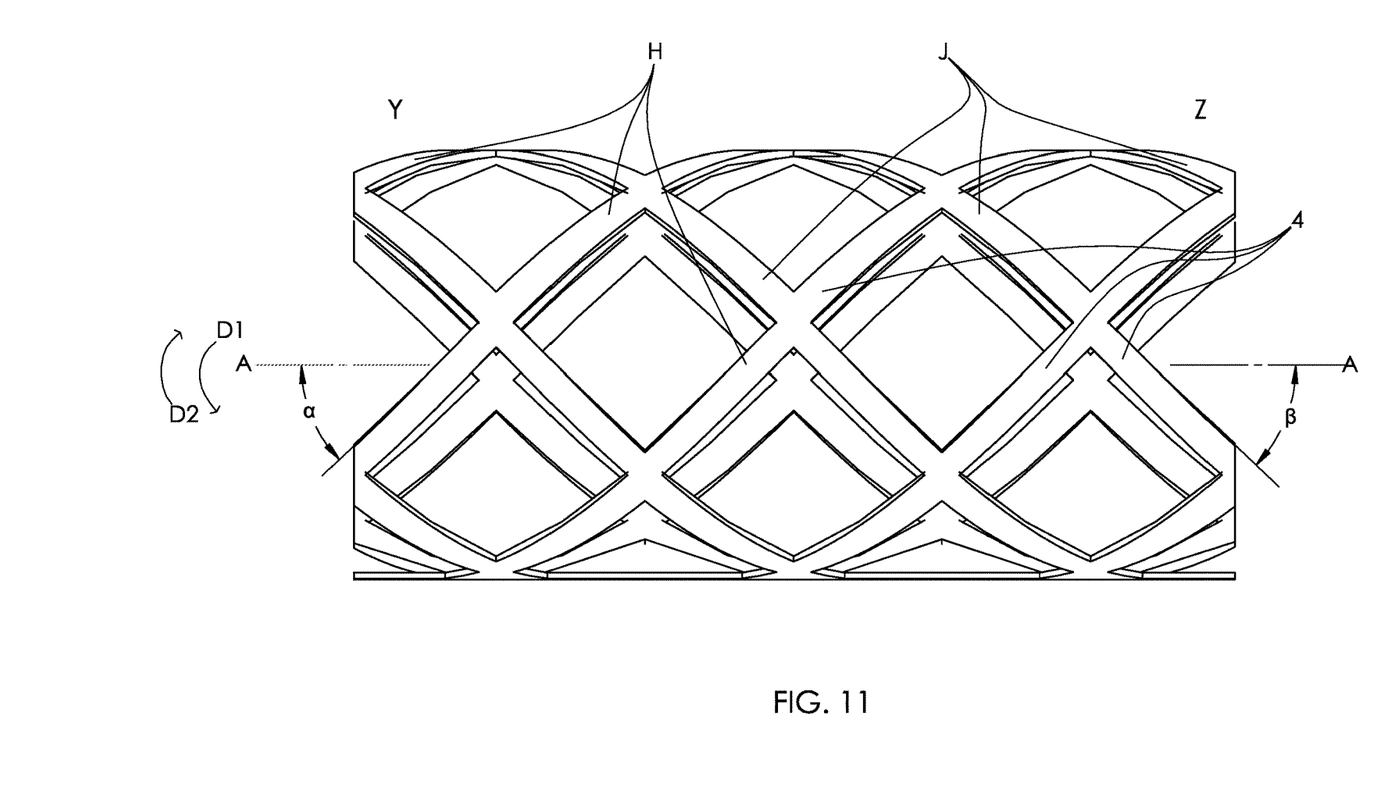
FIG. 11 is a top view of multi-start spirals with a diamond shaped profile.

In FIG. 11, the multi-start spirals (4) have been designed with an arrangement of individual spirals that are configured in a generally diamond shape, consisting of angled spiral sections (H) and (J). The angled spiral sections (H) and (J) in this embodiment are depicted at opposing angles ($\alpha$) and ($\beta$) at approximately 45 degrees in relation to central axis (A) as the pulley rotates in direction (D1). When the rotation of the directional discharge wing pulley (1) changes to D2, the spiral sections (H) and (J) still intersect at opposing angles ($\alpha$) and ($\beta$) that are approximately 45 degrees in relation to central axis (A). While angles ($\alpha$) and ($\beta$) are depicted as symmetrical, asymmetrical angles and spacing may be used in some applications.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wing pulley comprising:
   a core having a circumference and a longitudinal axis; and
   a plurality of wings arranged about said circumference of said core, each of said wings extending generally longitudinally at an angle to said longitudinal axis to discharge material in a single direction, each of said wings having at least one angled section, all of said angled sections in each of said wings being oriented to direct material in said single direction;
   wherein each of said wings is asymmetric about a centerline of the wing pulley that is orthogonal to the longitudinal axis.

2. The wing pulley of claim 1 wherein each of said wings include at least one strengthening rib bend.

3. The wing pulley of claim 2 wherein each of said wings includes at least two strengthening rib bends positioned equidistant from the longitudinal axis and from the centerline.

4. The wing pulley of claim 1 wherein each wing include a plurality of discrete wing segments.

5. The wing pulley of claim 1 wherein each wing includes a plurality of deflectors, each of said deflectors being defined by a section of the wing disposed at an angle to a general extent of the wing.

6. The wing pulley of claim 1 wherein each wing include a wing tip, said wing tip extending longitudinally along an outer end of said wing to engage a conveyor belt.

7. The wing pulley of claim 1 wherein each wing includes a plurality of circumferential wing tips, said circumferential wing tips extending around the circumference of the core to engage a conveyor belt.

8. The wing pulley of claim 7 wherein each of said plurality of circumferential wing tips are spaced along a longitudinal extent of the wing pulley and positioned symmetrically about the centerline.

9. The wing pulley of claim 1 further including a plurality of multi-start spirals affixed to said plurality of wings, said multi-start spirals disposed outwardly from an outer edge of each wing whereby said plurality of multi-start spirals are configured to cooperatively engage a conveyor belt.

10. The wing pulley of claim 1 further including a multi-start spiral affixed to said plurality of wings and defining an outer circumference of the wing pulley, said multi-start spiral including a plurality of spirals spaced apart from one another about the wing pulley, each of said spirals having at least one angled section oriented to urge material away from a space between adjacent pairs of said wings.

11. The wing pulley of claim 10 wherein said spirals are symmetrically configured to provide equivalent operation regardless of a direction of rotation of the wing pulley.

12. A wing pulley comprising:
a core having a circumference and a longitudinal axis; and
a plurality of wings arranged about said circumference of said core, each of said wings extending generally longitudinally at an angle to said longitudinal axis to generally discharge material in a single direction, each of said wings having at least one angled section, all of said angled sections in each of said wings being oriented to direct material in said single direction;
wherein said core includes a plurality of planar core segments joined together to form a closed polygon structure rotatable about said longitudinal axis.

13. The wing pulley of claim 12 wherein each of said wings extends from a first point proximate a corner formed by a first end of said core and a first side of said core to a second point proximate an opposite corner formed by a second end of said core opposite said first end and a second side of said core opposite said first side.

14. The wing pulley of claim 1 further comprising first and second ends spaced apart in a longitudinal direction, wherein the wing pulley is capable of rotation in a first rotational direction to direct material in a first single direction toward the first end of the wing pulley and a second rotational direction opposite the first rotational direction to direct material in a second single direction, opposite said first single direction, toward the second end of the wing pulley.

15. A wing pulley comprising:
a core having a rotational axis and an outer surface;
a plurality of primary wing segments affixed to said core in a radially symmetric arrangement about said outer surface;
a plurality of secondary wing segments affixed to said core in a radially symmetric arrangement about said outer surface; and
wherein said primary wing segments and said secondary wing segments are arranged in a herringbone pattern with said primary wing segments and said secondary wing segments extending at opposing angles to urge material in opposite directions.

16. The wing pulley of claim 15 wherein each secondary wing segment defines a clean out port.

17. The wing pulley of claim 15 wherein each secondary wing segment includes a first end engaged with a first primary wing segment and a first side engaged with a second primary wing segment.

18. The wing pulley of claim 17 wherein each primary wing segment is substantially longer than each secondary wing segment, and wherein said herringbone pattern is offset from a longitudinal center of the wing pulley.

19. A wing pulley comprising:
a polygonal core having a longitudinal axis and including first and second axial ends spaced apart in a longitudinal direction and a plurality of planar sides extending longitudinally between said first and second axial ends; and
a plurality of wings radially spaced apart about said polygonal core, each of said plurality of wings extending generally longitudinally at an angle to said longitudinal axis to generally discharge material in a single direction, each of said wings being supported by at least three of said planar sides, each of said plurality of wings extending from a first point proximate a first corner formed by said first axial end and a first of said planar sides to a second point proximate a second corner formed by said second axial end and a second of said planar sides opposite said first of said planar sides.

20. The wing pulley of claim 19 wherein each of said wings has at least one angled section, all of said angled sections in each of said plurality of wings being oriented to direct material in said single direction.

21. The wing pulley of claim 20 further including at least one circumferential wing tip extending around a circumference of the wing pulley.

22. The wing pulley of claim 20 further including a plurality of circumferential wing tips affixed to said plurality of wings, said circumferential wing tips extending circumferentially around the wing pulley to provide an interface for engaging a conveyor belt.

23. The wing pulley of claim 22 wherein said plurality of circumferential wing tips are arranged symmetrically about a longitudinal center of the wing pulley to facilitate conveyor belt tracking despite said angle of said wings.

24. The wing pulley of claim 23 wherein each of said plurality of wings includes at least one strengthening rib bend.

25. The wing pulley of claim 23 wherein each of said plurality of wings includes at least two strengthening rib bends positioned equidistant from the longitudinal axis and from a centerline of the wing pulley.

* * * * *